US011507599B2

United States Patent
Xu et al.

(10) Patent No.: US 11,507,599 B2
(45) Date of Patent: Nov. 22, 2022

(54) PROCESSING TRANSACTIONS IN A SYNCHRONIZED REPLICATION SYSTEM

(71) Applicant: EMC Corporation, Hopkinton, MA (US)

(72) Inventors: Ning Xu, Shanghai (CN); Alex Minghui Zhang, Shanghai (CN); Brian Tianfang Xiong, Shanghai (CN); Yuanyang Wu, Shanghai (CN); Yifeng Lu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 674 days.

(21) Appl. No.: 14/970,978

(22) Filed: Dec. 16, 2015

(65) Prior Publication Data
US 2016/0196322 A1 Jul. 7, 2016

(30) Foreign Application Priority Data

Jan. 4, 2015 (CN) .......................... 201510004778.4

(51) Int. Cl.
G06F 16/27 (2019.01)
G06F 16/23 (2019.01)
(Continued)

(52) U.S. Cl.
CPC ........ *G06F 16/275* (2019.01); *G06F 16/1734* (2019.01); *G06F 16/1865* (2019.01);
(Continued)

(58) Field of Classification Search
CPC ........... G06F 11/1469; G06F 17/30371; G06F 17/30575; G06F 17/30578;
(Continued)

(56) References Cited

U.S. PATENT DOCUMENTS

| 5,327,556 A * | 7/1994 | Mohan ................ G06F 12/0815 |
| | | 707/999.009 |
| 7,577,868 B2 | 8/2009 | Aidun |
| 8,055,615 B2 | 11/2011 | Roberts et al. |
| 8,108,580 B1 | 1/2012 | Chatterjee et al. |

(Continued)

FOREIGN PATENT DOCUMENTS

| CN | 102037463 | 4/2011 |
| CN | 102891849 | 1/2013 |

(Continued)

Primary Examiner — Tamara T Kyle
Assistant Examiner — Berhanu Mitiku
(74) Attorney, Agent, or Firm — BainwoodHuang

(57) ABSTRACT

Embodiments of the present disclosure provide a method, a computer program product and apparatus for processing transactions in a synchronized replication system, wherein the method comprises, at a source site in the synchronized replication system: serializing commits of transactions in the synchronized replication system so that only one of the transactions can be committed at the same time; in response to initiating the commit of the one transaction, generating a log for each of transactions that are ongoing in the synchronized replication system, so as to record impact of all operations of a respective transaction on the synchronized replication system; marking transactions for which the logs have been generated; and completing commits of the marked transactions.

9 Claims, 3 Drawing Sheets

(51) Int. Cl.
*G06F 16/17* (2019.01)
*G06F 16/2453* (2019.01)
*G06F 16/2455* (2019.01)
*G06F 16/18* (2019.01)

(52) U.S. Cl.
CPC ...... *G06F 16/2343* (2019.01); *G06F 16/2358* (2019.01); *G06F 16/2365* (2019.01); *G06F 16/2379* (2019.01); *G06F 16/24539* (2019.01); *G06F 16/24552* (2019.01); *G06F 16/273* (2019.01)

(58) Field of Classification Search
CPC ............. G06F 17/30581; G06F 16/275; G06F 16/739; G06F 16/27; G06F 16/178; G06F 16/273; G06F 16/2365; G06F 16/2343; G06F 16/2336; G06F 16/2308; G06F 16/2477; G06F 16/284; G06F 16/1734; G06F 16/2438; G06F 16/24539; G06F 16/2379; G06F 16/2358; G06F 16/24552
See application file for complete search history.

(56) References Cited

U.S. PATENT DOCUMENTS

| | | |
|---|---|---|
| 8,560,792 B2 | 10/2013 | Jennas, II et al. |
| 8,667,330 B1 | 3/2014 | Chatterjee et al. |
| 8,806,274 B1 | 8/2014 | Chatterjee et al. |
| 9,026,491 B2 | 5/2015 | Lee et al. |
| 9,052,833 B2 | 6/2015 | Petersen et al. |
| 9,053,073 B1 | 6/2015 | Subramanian et al. |
| 2004/0177099 A1* | 9/2004 | Ganesh ............... G06F 11/1471 |
| 2005/0165858 A1 | 7/2005 | Tom et al. |
| 2006/0190504 A1* | 8/2006 | Pruet, III .......... G06F 17/30362 |
| 2006/0218206 A1* | 9/2006 | Bourbonnais ..... G06F 17/30377 |
| 2007/0021970 A1* | 1/2007 | Schreter ................. G06Q 20/00 |
| | | 719/316 |
| 2010/0191884 A1* | 7/2010 | Holenstein .......... G06F 11/2094 |
| | | 707/613 |
| 2014/0258223 A1 | 9/2014 | Cao Minh et al. |
| 2016/0147859 A1* | 5/2016 | Lee .................... G06F 11/1469 |
| | | 707/615 |

FOREIGN PATENT DOCUMENTS

| | | |
|---|---|---|
| CN | 103885986 | 6/2014 |
| CN | 103970833 | 8/2014 |

* cited by examiner

PROCESSING TRANSACTIONS IN A SYNCHRONIZED REPLICATION SYSTEM

RELATED APPLICATION

This application claim priority from Chinese Patent Application Number CN201510004778.4, filed on Jan. 4, 2015 at the State Intellectual Property Office, China, titled "METHOD AND APPARATUS FOR PROCESSING TRANSACTION IN A SYNCHRONIZED REPLICATION SYSTEM," the contents of which is herein incorporated by reference in entirety.

FIELD OF THE INVENTION

Embodiments of the present disclosure relate to the field of storage systems.

BACKGROUND

With rapid developments of computer technology, in recent times research in the area of storage technology has gained importance. A problem in the storage field is how to address failover of resources. Generally, the term "failover" involves switching to a standby storage system when a source storage system cannot provide services to users due to failure, e.g. having fault or power-down, so that the standby storage system takes over corresponding functions to provide services for the users.

SUMMARY OF THE INVENTION

Example embodiments of the present disclosure provide a system, a computer program product and a method for processing transactions in a synchronized replication system, wherein the method may comprise, at a source site in the synchronized replication system: serializing commits of transactions in the synchronized replication system so that only one of the transactions can be committed at the same time; in response to initiating the commit of the one transaction, generating a log for each of transactions that are ongoing in the synchronized replication system, so as to record impact of all operations of a respective transaction on the synchronized replication system; marking transactions for which the logs have been generated; and completing commits of the marked transactions.

BRIEF DESCRIPTION OF THE DRAWINGS

Through the detailed description of some embodiments of the present disclosure in the accompanying drawings, the features, advantages and other aspects of the present invention will become more apparent, wherein several embodiments of the present invention are shown for the illustration purpose only, rather than for limiting. In the accompanying drawings.

DETAILED DESCRIPTION

Figure 1:
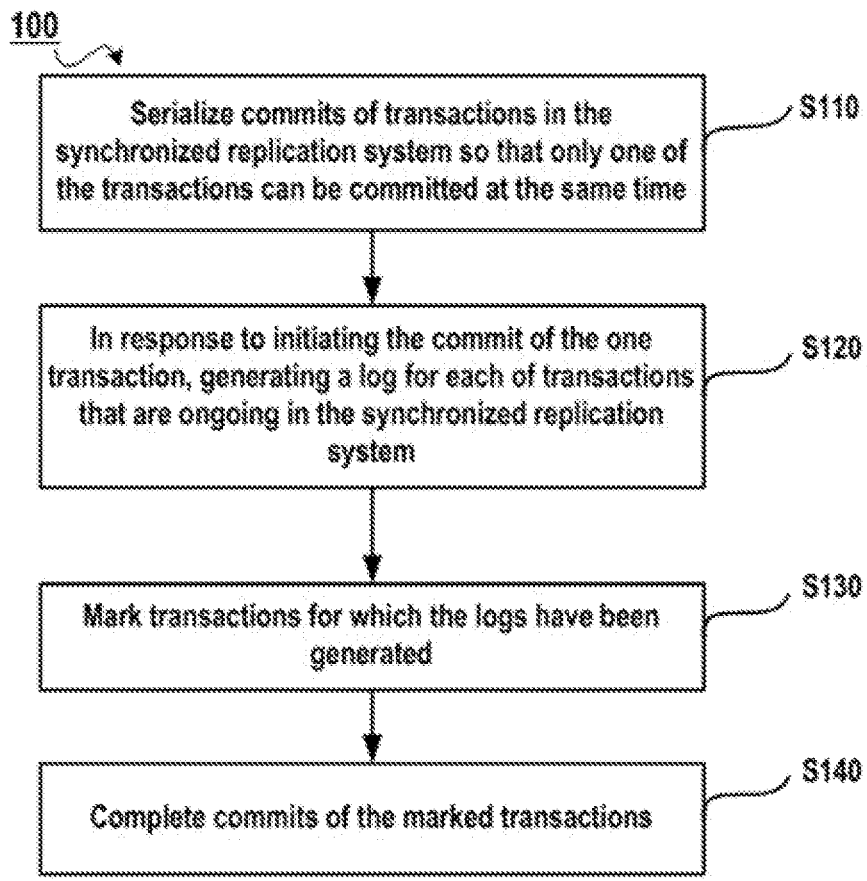
FIG. 1 shows an exemplary flowchart of method 100 for processing transactions in a synchronized replication system according to an embodiment of the present disclosure.

With reference to the figures, detailed description is presented below for various embodiments of the present disclosure. The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment, to implement fine granularity failover, usually synchronized replication of data may take place between a source storage system and a standby storage system, i.e. any change to data at a source storage system may happen at a standby storage system in real time so that data at two sides may be kept consistent to the extent possible. In an additional embodiment, a block level synchronized replication may often be adopted in "failover" because it may be much easier to implement than a file system level synchronized replication.

In some other embodiment, where a source storage system includes data sets that may be organized, stored and managed based on transaction mechanisms, such as databases, "failover" may happen right when a transaction is being committed at a source storage system. In such exemplary embodiments, a replicated database may be put into an inconsistent status, because one part of a replicated data set (e.g. database table) at a standby storage system may contain data after processing a transaction, while another part may contain data before processing the transaction. In some other embodiment, a standby storage system may not be able to take over corresponding functions of a source storage system to provide services. Embodiments of the present disclosure propose a solution that may keep "atomicity" of transactions in a synchronized replication system.

In some embodiments of this disclosure, a synchronized replication system may comprise, for example, a source storage system at a source site and a standby storage system at a destination site. In a further embodiment, synchronized replication, for example, block level synchronized replication, of data between a source storage system and s standby storage system may be implemented. In a further embodiment, when a source storage system cannot provide services for users due to failure, for example, such as fault or power-down, switching to a standby storage system from a source storage system may be performed. In a further embodiment, a standby storage system may take over corresponding functions and may provide services for users.

In a further embodiment, a source storage system and standby storage system each typically include data sets such as databases, which may be organized, stored and managed based on a transaction mechanism. In a further embodiment, a "transaction" may refer to a series of relevant operations that may be executed as a single logical unit of work. In a further embodiment, consider an exemplary online shopping scenario, wherein the payment process of online shopping may at least include the following operations:

(i) Updating stock information of items bought/purchased by a customer;
(ii) Saving a customer's payment information, which might include interaction with a banking system;
(iii) Generating an order and saving it to a database;
(iv) Updating a customer's relevant information, e.g. amount of items, etc.

In a further embodiment, normally, the above operations may go on smoothly, and finally the transaction may succeed and all database information related to the transaction is updated successfully. In a further embodiment, if any step among the series of operations may be faulty, for example, an exception occurs when updating item stock information or the customer's bank balance is insufficient, the transaction may fail. In a further embodiment, once a transaction fails, all information in a database may have to remain in a status as it was before the transaction happened. In a further embodiment, for example, if a failure of a customer's information being updated at the last step leads to a transaction failure, then it may be ensured that the failing transaction may not affect a database status, i.e., stock information is not updated, customer does not complete a payment and the order is not generated. In a further embodiment, alternatively, the database information may be confusing and unpredictable.

In a further embodiment, from the above exemplary scenario, a transaction must be an atomic unit of work. In a further embodiment, with regards to data modification, either it may be completed in its entirety, or nothing may be completed; which may be called "atomicity" of a transaction. In a further embodiment, usually, operations associated with a certain transaction may have a common goal and may be interdependent. In a further embodiment, if only one subset of these operations is executed, the overall goal of the transaction might be wasted. In a further embodiment, it may be critical to keep a transactional "atomicity" in data sets that may be organized, stored and managed based on a transaction mechanism.

In a further embodiment, "failover" from a source storage system to a standby storage system may happen right when a transaction is being committed at the source storage system. In a further embodiment, in such cases, a replicated database may be put into an inconsistent status, because one part of a replicated data set at a standby storage system may contain data after processing a transaction, while another part may contain data before processing the transaction. In a further embodiment, such inconsistency may often be referred to as "application level inconsistency". Embodiments of the present disclosure propose to log operations of transactions to keep "atomicity" of the transactions, so as to solve an application level inconsistency.

Embodiments of the present disclosure provide a system, a computer program product and a method for processing transactions in a synchronized replication system. In a further embodiment, at a source site in a synchronized replication system may include serializing commits of transactions in a synchronized replication system so that only one of the transactions may be committed at a same time. A further embodiment may include in response to initiating a commit of one transaction, generating a log for each of transactions that may be ongoing in a synchronized replication system, so as to record impact of all operations of a respective transaction on the synchronized replication system. A further embodiment may include marking transactions for which the logs may have been generated. A further embodiment may include completing commits of marked transactions.

In a further embodiment, serializing commits of transactions in a synchronized replication system so that only one of the transactions may be committed at the same time may include causing only one of the transactions to acquire a commit lock at a same time. A further embodiment may include in response to failure of a source site, initiating switching to a destination site in a synchronized replication system, wherein a synchronized replication of data is implemented between a source site and a destination site.

A further embodiment may include determining, at a destination site, whether transactions for which commits have not been completed may be marked or not. A further embodiment may include in response to determining that transactions are marked, updating, with content of logs generated for the transactions, data that may be associated with the transactions and synchronously replicated from a source site to a destination site.

A further embodiment may include determining, at a destination site, whether transactions for which commits have not been completed may be marked or not. A further embodiment may include in response to determining transactions are not marked, trusting data that may be associated with the transactions and synchronously replicated from a source site to a destination site. A further embodiment may include removing the logs generated for the transactions. Further embodiment may include marking transactions for which logs may have been generated and may comprise creating a mark file for each of the transactions for which logs have been generated.

One embodiment may include an apparatus for processing transactions in a synchronized replication system. In a further embodiment, the apparatus may include the a number of units that may be disposed at a source site in a synchronized replication system. A further embodiment may include a serializing unit that may be configured to serialize commits of transactions in a synchronized replication system so that only one of the transactions may be committed at a same time. A further embodiment may include a log generating unit that may be configured to generate, in response to initiating a commit of the one transaction, a log for each of transactions that may be ongoing in a synchronized replication system, so as to record impact of all operations of a respective transaction on the synchronized replication system. A further embodiment may include a marking unit that may be configured to mark transactions for which logs have been generated. A further embodiment may include commit completing unit that may be configured to complete commits of the marked transactions.

One embodiment may include a computer program product, comprising a computer readable medium. A further embodiment may include a computer readable medium that may be configured to carry computer program code embodied therein and for use with a computer. In a further embodiment, computer program code may include code for serializing commits of transactions in a synchronized replication system so that only one of the transactions can be committed at a same time. A further embodiment may include code for, in response to initiating commits of the transactions, generating a log for each of transactions that may be ongoing in a synchronized replication system, so as to record impact of all operations of a respective transaction on the synchronized replication system. A further embodiment may include code for marking transactions for which the logs have been generated. A further embodiment may include code for completing commits of marked transactions. In a further embodiment, by recoding a log for operations of a transaction, "atomicity" of a transaction may be maintained, thereby overcoming any shortcomings with respect to any application level inconsistency.

FIG. 1 shows a flowchart of method 100 for processing transactions in a synchronized replication system according to an embodiment of the present invention. In step S110, at a source site, transactions in the synchronized replication system are serialized so that only one of the transactions can be committed at the same time. Then, in step S120, in response to initiating the commit of the one transaction, a log is generated for each of transactions that are ongoing in the synchronized replication system, so as to record impact of all operations of a respective transaction on the synchronized replication system. Next, in step S130, transactions for which the logs have been generated are marked. Thereafter, in step S140, commits of the marked transactions are completed.

In one embodiment, relative to a "destination site" to be mentioned later, a so-called "source site" as used herein refers to a site that may be originally used for provide services for users. In a further embodiment, in a synchronized replication system, a site that may be currently providing services for users may also be referred to as an "active site". In s further embodiment, when a "source site" provides services for users, it may be an active site in a synchronized replication system. In a further embodiment, when a source site is invalid, switching to a destination site may be initiated, so that the destination site takes over corresponding functions of the source site and continues to provide services for users. In a further embodiment, in this case, a "destination site" may become an active site in a synchronized replication system.

In one exemplary embodiment, the step of serializing commits of transactions in a synchronized replication system so that only one of the transactions may be committed at a same time can be committed at a same time may be implemented by: ranking transactions to be committed in a predetermined order (e.g. an order of priority) and providing a commit lock according to an order so that only one transaction may acquire a commit lock at a same time, a commit lock being released upon completion of a transaction having a commit lock. In a further embodiment any approach may be used in reality so as to cause only one transaction to be committed at a same time.

In a further embodiment, regarding a data set such as a database which may be organized, stored and managed based on a transaction mechanism, there might be a plurality of concurrent transactions. In a further embodiment, when operations of each transaction are completed, a commit of a respective transaction may be initiated, and each committed transaction may acquire a commit lock. In a further embodiment, commits of transactions may be implemented concurrently. However, in the embodiments of the present disclosure, commits of transactions are serialized so that only one transaction may be committed at a same time and a committed transaction will acquire a commit lock. In a further embodiment, a commit lock may be global with respect to an active site in a synchronized replication system and thus may be called "global commit lock". In a further embodiment, for example, where a source site acts as an active site in a synchronized replication system, a commit lock is global with respect to the source site; where a destination site acts as the active site in the synchronized replication system, the commit lock is global with respect to the destination site. In a further embodiment, a design that a duration of a commit operation may be short and infrequent may be out of consideration, so a commit lock may be changed from a commit lock per transaction to a global commit lock.

In a further embodiment, through step S120, changes to data of a synchronized replication system may be made by all operations of a transaction and may be saved in a log. In a further embodiment, in an implementation, a log may be in a form of a log file, for example, .bak file. In one embodiment, (Step S130) marking transactions for which logs have been generated may include creating a mark file for each of the transactions for which logs have been generated. In another embodiment, marking transactions for which logs have been generated may include adding in a database table a mark associated with a respective transaction. In a further embodiment, with reference to Step S140, changes involved in operations of the transactions may be applied to a data set in a synchronized replication system so as to update the data set.

In addition, method 100 may optionally comprise: after completing a commit of a transaction, removing a mark of the transaction, for example, removing a mark file.

In one embodiment, it may be understood that all steps S110 to S140 may be executed at a source site in a synchronized replication system. In a further embodiment, when a source site becomes invalid, switching to a destination site may be initiated, so that the destination site takes over corresponding functions of the source site and continues to provide services for users. In a further embodiment, in response to initiating a switching to a destination site, the following steps may be performed, where it may be determined whether a transaction for which commit is not completed is marked or not. If it is determined that a transaction for which a commit is not completed has been marked, content of a log generated for the transaction is trusted at a destination site. Thus, data, which may be associated with a transaction and replicated from a source site to a destination site, may be updated with a content of a log generated for a transaction. After the updating, content of a log generated for a transaction may be removed.

In a further embodiment, on the other hand, a transaction for which the commit is not completed will not be marked under one of the following conditions:
(1) when data involved in operations of a transaction is still in a memory, a source site becomes invalid and switching to a destination site may be initiated;
(2) a source site becomes invalid when generating a log for a transaction, and switching to a destination site may be initiated;
(3) when a log has been generated for a transaction but the transaction has not been marked, a source site becomes invalid and switching to a destination site may be initiated; and
(4) when data associated with the transaction has been updated at a source site by using content of a log generated for a transaction, a source site becomes invalid and switching to a destination site may be initiated.

In a further embodiment, where it may be determined that a transaction for which a commit is not completed has not marked, data, which may be associated with the transaction and synchronously replicated from a source site to a destination site, may be trusted. In a further embodiment, it may be understood that under the above condition (4), content of a log generated for a transaction might exist at a destination site, at which point since a transaction may not be marked, content of a log is not trusted but removed.

In a further embodiment, in method 100, a log may be generated for operations of a transaction, so that any changes made by all operations of the transaction to data of a synchronized replication system may be saved in the log. In a further embodiment, subsequently, a transaction for which a log is generated may be marked. In a further embodiment, in switching to a destination site, if it is determined there exists a mark for a transaction, content of a log generated for the transaction is trusted, otherwise content of a data set replicated to a destination site is trusted. In a further embodiment, a problem of inconsistency in content of data sets during failover in the synchronized replication system may be resolved.

As one exemplary embodiment, a source site and a destination site in a synchronized replication system may exist in the form of Virtual Data Mover (VDM). In a further embodiment, a VDM may include a data LUN (Logical Unit Number) and a control LUN. In a further embodiment, data may be stored on the data LUN, while metadata may be stored on a control LUN. In a further embodiment, on a control LUN, metadata may be usually organized, managed and stored in the form of NAS database (Network Attached Storage Database). In a further embodiment, NAS database may be a text database based on a transaction mechanism. In a further embodiment, to keep data on source VDM and destination VDM consistent as far as possible, block level data synchronized replication may be often implemented between source VDM and destination VDM. In this embodiment, in implementing failover from source VDM to destination VDM, since atomicity of transactions for NAS database cannot be kept, after failover, some NAS database tables may contain data after processing a transaction while others may contain data before processing a transaction, resulting in a NAS database inconsistency. In a further embodiment, method 100 may also be applicable to keep atomicity of NAS database transactions so as to solve problems of a NAS database inconsistency. In a further embodiment, the method may be applied to various types of data organization based on a transaction mechanism, rather than being limited to databases.

Figure 2:
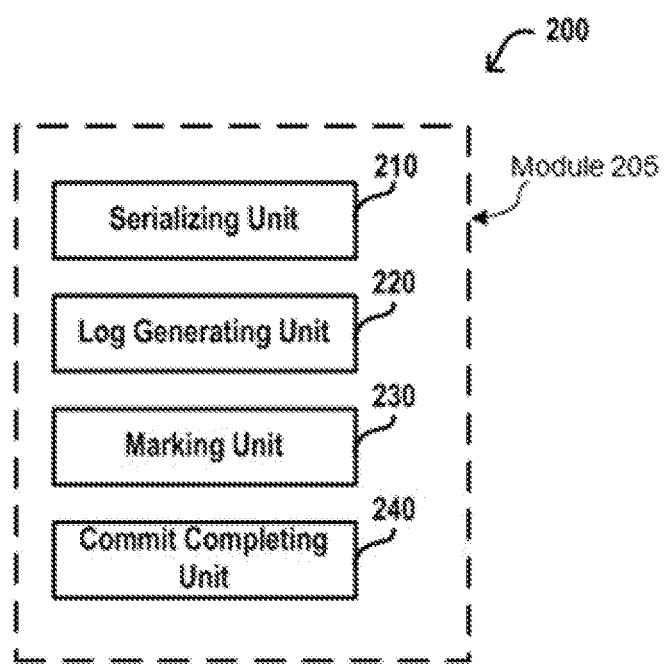
FIG. 2 shows an exemplary schematic block diagram of apparatus 200 for processing transactions in a synchronized replication system according to an embodiment of the present disclosure.

The embodiments of the present disclosure further provide an apparatus for processing transactions in a synchronized replication system. FIG. 2 shows a block diagram of apparatus 200 for processing transactions in a synchronized replication system.

As shown in FIG. 2, apparatus 200 comprises the following units which are disposed at a source site in the synchronized replication system: serializing unit 210 configured to serialize commits of transactions in the synchronized replication system so that only one of the transactions can be committed at the same time; log generating unit 220 configured to generate, in response to initiating the commit of the one transaction, a log for each of transactions that are ongoing in the synchronized replication system, so as to record impact of all operations of a respective transaction on the synchronized replication system; marking unit 230 configured to mark transactions for which the logs have been generated; and commit completing unit 240 configured to complete commits of the marked transactions.

In one embodiment, serializing unit 210 may be further configured to cause only one of the transactions to acquire a commit lock at the same time. In one embodiment, apparatus 200 may further comprises a switching unit configured to initiate switching to a destination site in a synchronized replication system in response to failure of a source site. In a further embodiment, a synchronized replication of data may be implemented between the source site and the destination site.

In one embodiment, apparatus 200 may further comprise: a checking unit configured to determine, at the destination site, whether transactions for which commits have not been completed are marked or not. A further embodiment may include a determining unit configured, in response to determining the transactions are marked, to update, with content of logs generated for the transactions, data which may be associated with the transactions and synchronously replicated from a source site to a destination site.

In one embodiment, apparatus 200 may further comprise: a checking unit that may be configured to determine, at a destination site, whether transactions for which commits have not been completed may be marked or not. A further embodiment may include a determining unit that may be configured, in response to determining transactions are not marked, to trust data which may be associated with the transactions and synchronously replicated from a source site to a destination site.

In one embodiment, apparatus 200 may further comprises a removing unit that may be configured to remove logs generated for the transactions. In one embodiment, marking unit 230 may be further configured to create a mark file for each of the transactions for which the logs have been generated. In one embodiment each of the unit and sub-unit can be replace by a single module 205 that may be configured to perform the tasks of each of the unit in an orderly manner to achieve the end results as discussed above with respect to the separate units.

Embodiments of the present invention further provide a computer program product, comprising a computer readable medium. The computer readable medium carries computer program code embodied therein and for use with a computer. The computer program code comprises: code for serializing commits of transactions in the synchronized replication system so that only one of the transactions can be committed at the same time; code for, in response to initiating the commits of the transactions, generating a log for each of transactions that are ongoing in the synchronized replication system, so as to record impact of all operations of a respective transaction on the synchronized replication system; code for marking transactions for which the logs have been generated; and code for completing commits of the marked transactions.

Figure 3:
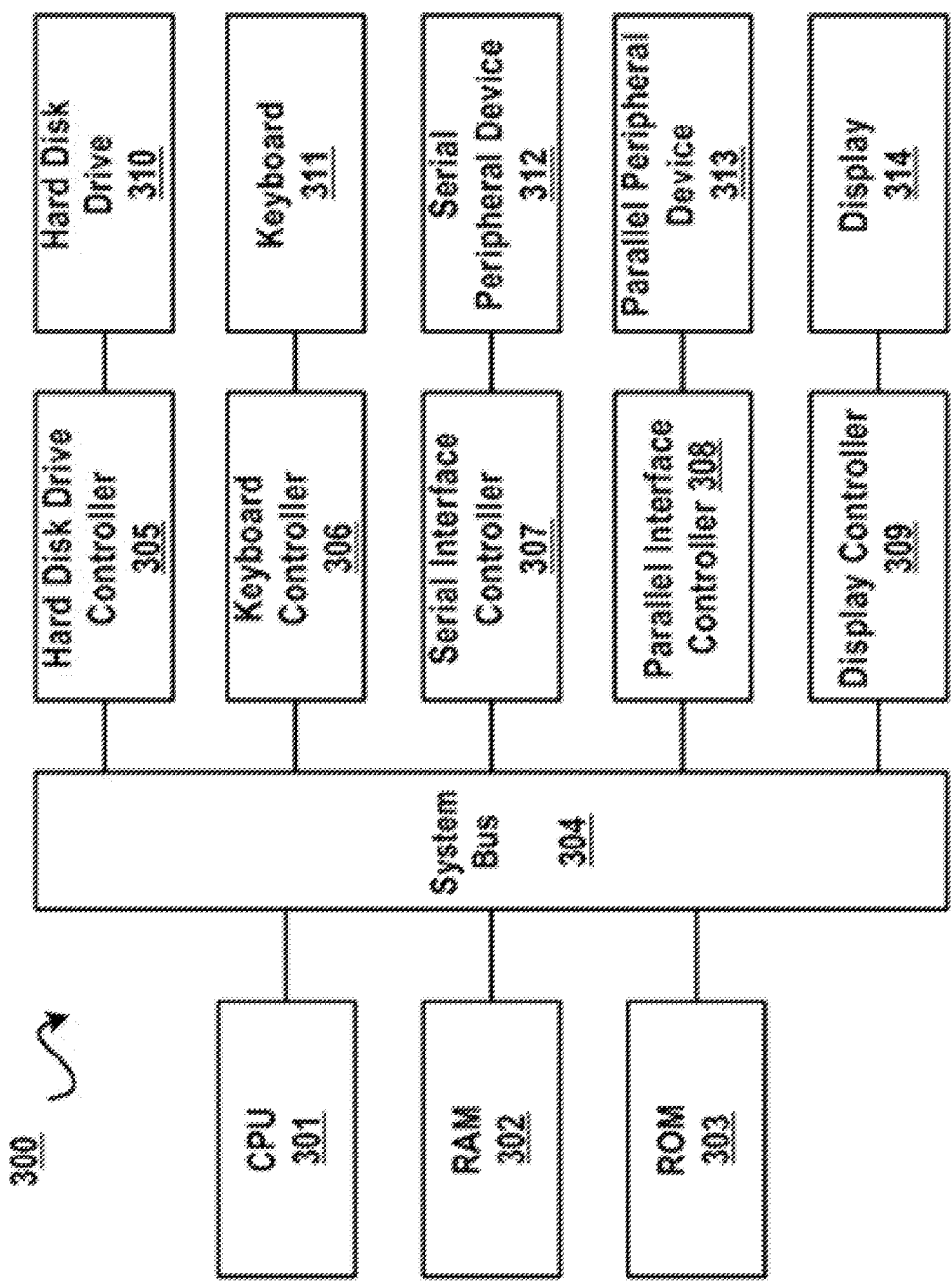
FIG. 3 shows an exemplary schematic block diagram of a computer system 300 which is applicable to implement the embodiments of the present disclosure.

With reference to FIG. 3, this figure shows a schematic block diagram of computer system 300 which is applicable to implement the embodiments of the present invention. For example, computer system 300 shown in FIG. 3 may be used for implementing the above-described apparatus 300 for processing transactions in a synchronized replication system.

As shown in FIG. 3, computer system 300 may include: a CPU (Central Processing Unit) 301, RAM (Random Access Memory) 302, ROM (Read Only Memory) 303, system bus 304, hard disk drive controller 305, keyboard controller 306, serial interface controller 307, parallel interface controller 308, display controller 309, hard disk drive 310, keyboard 311, serial peripheral device 312, parallel peripheral device 313 and a display 314. Among these devices, connected to the system bus 304 are CPU 301, RAM 302, ROM 303, hard disk drive controller 305, keyboard controller 306, serial interface controller 307, parallel interface controller 308 and display controller 309. Hard disk drive 310 is coupled to hard disk drive controller 305; keyboard 311 is coupled to keyboard controller 306; serial peripheral device 312 is coupled to serial interface controller 307; and parallel peripheral device 313 is coupled to parallel interface controller 308; and display 314 is coupled to display controller 309. It should be understood that the structural block diagram in FIG. 3 is shown only for illustration purpose, and is not intended to limit the scope of the present invention. In some cases, some devices may be added or reduced as required.

As above mentioned, apparatus 200 may be implemented through pure hardware, for example, chip, ASIC, SOC, etc. Such hardware may be integrated into computer system 300. Besides, the embodiments of the present invention may also be implemented in a form of a computer program product. For example, method 100 as described with reference to FIG. 1 may be implemented via a computer program product. This computer program product may be stored in RAM 302, ROM 303, hard disk drive 310 and/or any suitable storage medium as illustrated in FIG. 3, or downloaded to computer system 300 from a suitable location in the network. The computer program product may comprise computer code portions comprising program instructions that may be executed through a suitable processing device (for example, CPU 301 as shown in FIG. 3). The program instruction at least may comprise instructions for implementing the steps of method 100.

It should be noted that, embodiments of the present invention may be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present invention may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units or subunits of the apparatuses have been mentioned in the above detailed depiction, such partitioning is merely non-compulsory. In actuality, according to the embodiments of the present invention, the features and functions of two or more units above described may be embodied in one unit. On the contrary, the features and functions of one unit above described may be further partitioned to be embodied in more units.

Besides, although operations of the present methods are described in a particular order in the drawings, it does not require or imply that these operations must be performed according to this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step for execution, and/or a step may be divided into a plurality of steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. A method for processing transactions in a synchronized replication system having a source site and a destination site, wherein a synchronized replication of data is implemented between the source site and the destination site, comprising, at the source site and destination site in the synchronized replication system:

ranking commits of transactions to be committed in a sequential order in the synchronized replication system so that only one of the transactions can be committed at an instance in time, wherein ranking commits of transactions to be committed in sequential order comprises causing only one of the transactions to acquire a commit lock at the instance in time, wherein the commit lock is acquired by the one transaction upon completion of operations of the one transaction, and wherein the commit lock is global with respect to the source site while the source site acts as an active site in the synchronized replication system and provides services to users;

in response to acquiring the commit lock and initiating the commit of the one transaction, generating a log for each of the transactions that are ongoing in the synchronized replication system, so as to record an impact of all operations of each respective transaction on the synchronized replication system;

marking transactions for which the logs have been generated, wherein marking transactions for which the logs have been generated comprises creating a mark file for each of the transactions for which the logs have been generated;

completing commits of the marked transactions according to the sequential order, wherein completing the commits modifies a database within the synchronized replication system;

after completing the commits of the marked transactions for which the logs have been generated, removing marks of the transactions for which the logs have been generated by removing a mark file for each of the transactions for which the logs have been generated;

in response to failure of the source site, initiating switching to the destination site in the synchronized replication system, wherein initiating switching to the destination site in the synchronized replication system causes the destination site to begin acting as the active site in the synchronized replication system and continues to provide the services for the users, and wherein causing the destination site to begin acting as the active site in the synchronized replication system causes the global commit lock to become global with respect to the destination site while the destination site acts as the active site;

determining, at the destination site, whether transactions for which commits have not been completed are marked or not; and in response to determining whether transactions for which commits have not been completed are marked or not, updating, with content of the logs generated for marked transactions for which commits have not been completed, data which is associated with the marked transactions for which commits have not been completed and that is synchronously replicated from the source site to the destination site.

2. The method according to claim 1, further comprising:

in response to determining if the transactions are not marked, trusting data which is associated with the transactions and synchronously replicated from the source site to the destination site.

3. The method according to claim 2, further comprising:

removing the logs generated for the transactions.

4. The method according to claim 1, further comprising:

wherein the database within the synchronized replication system comprises a Network Attached Storage (NAS) database storing metadata that is replicated between the source site and the destination site.

5. An apparatus for processing transactions in a synchronized replication system, the synchronized replication system having a source site and a destination site, wherein a synchronized replication of data is implemented between the source site and the destination site, comprising at least one storage device and at least one hardware processor at the source site and the destination site in the synchronized replication system, the apparatus comprising at least one module configured to:

rank commits of transactions to be committed in a sequential order in the synchronized replication system so that only one of the transactions can be committed at an instance in time, wherein ranking commits of transactions to be committed in sequential order comprises causing only one of the transactions to acquire a commit lock at the instance in time, wherein the commit lock is acquired by the one transaction upon completion of operations of the one transaction, and wherein the commit lock is global with respect to the source site while the source site acts as an active site in the synchronized replication system and provides services to users;

generate, in response to acquiring the commit lock and initiating the commit of the one transaction, a log for each of the transactions that are ongoing in the synchronized replication system, so as to record an impact of all operations of each respective transaction on the synchronized replication system;

mark transactions for which the logs have been generated, wherein transactions for which the logs have been generated are marked at least in part by creation of a mark file for each of the transactions for which the logs have been generated;

complete commits of the marked transactions according to the sequential order, wherein completing the commits modifies a database within the synchronized replication system;

after completion of the commits of the marked transactions for which the logs have been generated, remove marks of the transactions for which the logs have been generated by removing a mark file for each of the transactions for which the logs have been generated;

in response to failure of the source site, initiate switching to the destination site in the synchronized replication system, wherein initiating switching to the destination site in the synchronized replication system causes the destination site to begin acting as the active site in the synchronized replication system and continues to provide the services for the users, and wherein causing the destination site to begin acting as the active site in the synchronized replication system causes the global commit lock to become global with respect to the destination site while the destination site acts as the active site;

determine, at the destination site, whether transactions for which commits have not been completed are marked or not; and in response to a determination as to whether transactions for which commits have not been completed are marked or not, update, with content of the logs generated for marked transactions for which commits have not been completed, data which is associated with the marked transactions for which commits have not been completed and that is synchronously replicated from the source site to the destination site.

6. The apparatus according to claim 5, the module further configured to:

in response to determining if the transactions are not marked, to trust data which is associated with the transactions and synchronously replicated from the source site to the destination site.

7. The apparatus according to claim 6, further configured to:

remove logs generated for the transactions.

8. A computer program product stored on a non-transitory computer readable medium with program instructions stored thereon for processing transactions in a synchronized replication system, the synchronized replication system having a source site and a destination site, wherein a synchronized replication of data is implemented between the source site and the destination site, the program instructions configured to, when executed, perform the following acts:

ranking commits of transactions to be committed in a sequential order in the synchronized replication system so that only one of the transactions can be committed at an instance in time, wherein ranking commits of transactions to be committed in sequential order comprises causing only one of the transactions to acquire a commit lock at the instance in time, wherein the commit lock is acquired by the one transaction upon completion of operations of the one transaction, and wherein the commit lock is global with respect to the source site while the source site acts as an active site in the synchronized replication system and provides services to users;

in response to acquiring a commit lock and initiating the commits of the transactions, generating a log for each of the transactions that are ongoing in the synchronized replication system, so as to record an impact of all operations of each respective transaction on the synchronized replication system;

marking transactions for which the logs have been generated, wherein marking transactions for which the logs have been generated comprises creating a mark file for each of the transactions for which the logs have been generated;

completing commits of the marked transactions according to the sequential order, wherein completing the commits modifies a database within the synchronized replication system;

after completing the commits of the marked transactions for which the logs have been generated, removing marks of the transactions for which the logs have been generated by removing a mark file for each of the transactions for which the logs have been generated;

in response to failure of the source site, initiating switching to the destination site in the synchronized replication system, wherein initiating switching to the destination site in the synchronized replication system causes the destination site to begin acting as the active site in the synchronized replication system and continues to provide the services for the users, and wherein causing the destination site to begin acting as the active site in the synchronized replication system causes the global commit lock to become global with respect to the destination site while the destination site acts as the active site;

determining, at the destination site, whether transactions for which commits have not been completed are marked or not; and in response to determining whether transactions for which commits have not been completed are marked or not, updating, with content of the logs generated for marked transactions for which commits have not been completed, data which is associated with the marked transactions for which commits have not been completed and that is synchronously replicated from the source site to the destination site.

9. The computer program product according to claim 8 further comprising:

in response to determining if the transactions are not marked, trusting data which is associated with the transactions and synchronously replicated from the source site to the destination site; and removing the logs generated for the transactions.

* * * * *